US012514290B2

(12) United States Patent
Frederick et al.

(10) Patent No.: US 12,514,290 B2
(45) Date of Patent: Jan. 6, 2026

(54) HEATING ELEMENT HAVING INCREASED RESISTANCE

(71) Applicant: PHILIP MORRIS PRODUCTS S.A., Neuchatel (CH)

(72) Inventors: Guillaume Frederick, Les-Geneveys-sur-Coffrane (FR); Ihar Nikolaevich Zinovik, Peseaux (CH)

(73) Assignee: Philip Morris Products S.A., Neuchatel (CH)

( * ) Notice: Subject to any disclaimer, the term of this patent is extended or adjusted under 35 U.S.C. 154(b) by 349 days.

(21) Appl. No.: 18/026,485

(22) PCT Filed: Sep. 23, 2021

(86) PCT No.: PCT/EP2021/076239

§ 371 (c)(1),
(2) Date: Mar. 15, 2023

(87) PCT Pub. No.: WO2022/063919

PCT Pub. Date: Mar. 31, 2022

(65) Prior Publication Data

US 2024/0008538 A1 Jan. 11, 2024

(30) Foreign Application Priority Data

Sep. 23, 2020 (EP) .................................... 20197866

(51) Int. Cl.

*A24F 40/46* (2020.01)
*A24F 40/10* (2020.01)
*H05B 3/12* (2006.01)

(52) U.S. Cl.

CPC .............. *A24F 40/46* (2020.01); *A24F 40/10* (2020.01); *H05B 3/12* (2013.01); *H05B 2203/021* (2013.01); *H05B 2203/037* (2013.01)

(58) Field of Classification Search

CPC ................................ A24F 40/10; A24F 40/46
See application file for complete search history.

(56) References Cited

U.S. PATENT DOCUMENTS 10,667,557 B2 * 6/2020 Mironov .................. H05B 3/26
2018/0295881 A1 * 10/2018 Mironov ............... A24F 40/485

FOREIGN PATENT DOCUMENTS

CN 209518269 10/2019
EP 3487324 11/2020

(Continued)

OTHER PUBLICATIONS

Machine Translation of WO 2022/048304 (Year: 2025).*

(Continued)

*Primary Examiner* — Russell E Sparks
(74) *Attorney, Agent, or Firm* — Mueting Raasch Group

(57) ABSTRACT

There is provided a heating element (11) for an aerosol-generating system, the heating element (11) comprising a mesh (12). The mesh (12) comprises a plurality of first filaments (20) extending in a first direction (21), wherein each of the first filaments (20) comprises a first end (24) and a second end (26). The mesh (12) also comprises a plurality of second filaments (22) extending in a second direction (23), wherein the first direction (21) is perpendicular to the second direction (23). Each of the second filaments (22) comprises a third end (28) and a fourth end (30). The second ends (26) of the first filaments (20) are electrically connected to the third ends (28) of the second filaments (22).

12 Claims, 3 Drawing Sheets

(56) References Cited

FOREIGN PATENT DOCUMENTS

| | | | | |
|---|---|---|---|---|
| WO | WO 2017/055866 | | 4/2017 | |
| WO | WO-2022048304 A1 | * | 3/2022 | ............. A24F 40/10 |

OTHER PUBLICATIONS

PCT International Search Report and Written Opinion for PCT/EP2021/076239 dated Dec. 22, 2021 (9 pages).
Extended European Search Report for Application No. 20197866.5 dated Mar. 21, 2019 (5 pages).

* cited by examiner

HEATING ELEMENT HAVING INCREASED RESISTANCE

This application is a U.S. National Stage Application of International Application No. PCT/EP2021/076239 filed Sep. 23, 2021, which was published in English on Mar. 31, 2022, as International Publication No. WO 2022/063919 A1. International Application No. PCT/EP2021/076239 claims priority to European Application No. 20197866.5 filed Sep. 23, 2020.

The present invention relates to a heating element for an aerosol-generating system. In particular, the present invention relates to a heating element for an aerosol-generating system, the heater element comprising first and second filaments extending in first and second directions, wherein ends of the first filaments are electrically connected to ends of the second filaments. The present invention also relates to a heater assembly, a cartridge, and an aerosol-generating system.

Handheld electrically operated aerosol-generating devices and systems are known that comprise a device portion comprising a battery and control electronics, a portion for containing or receiving a liquid aerosol-forming substrate and an electrically operated heater for heating the aerosol-forming substrate to generate an aerosol. In some devices, the heater comprises an electrically conductive mesh. An electric current can be passed through the mesh to resistively heat the heater and thereby generate an aerosol from the aerosol-forming substrate. A mouthpiece portion is also included on which a user may puff to draw aerosol into their mouth.

It would be desirable to increase the electrical resistance of a mesh heater while reducing, minimising or eliminate the need to increase the size of the mesh heater. It would be desirable to increase the electrical resistance of a mesh heater without changing a material used to form the mesh heater.

According to the present disclosure there is provided a heating element for an aerosol-generating system, the heating element comprising a mesh. The mesh may comprise a plurality of first filaments extending in a first direction. Each of the first filaments may comprise a first end and a second end. The mesh may comprise a plurality of second filaments extending in a second direction. The first direction may be perpendicular to the second direction. Each of the second filaments may comprise a third end and a fourth end. The second ends of the first filaments may be electrically connected to the third ends of the second filaments.

According to a first aspect of the present disclosure there is provided a heating element for an aerosol-generating system, the heating element comprising a mesh. The mesh comprises a plurality of first filaments extending in a first direction, wherein each of the first filaments comprises a first end and a second end. The mesh also comprises a plurality of second filaments extending in a second direction, wherein the first direction is perpendicular to the second direction. Each of the second filaments comprises a third end and a fourth end. The second ends of the first filaments are electrically connected to the third ends of the second filaments.

Advantageously, electrically connecting the second ends of the first filaments to the third ends of the second filaments may increase the path length for electric current flowing through the mesh. In particular, electric current flowing through the mesh may flow along the length of the first filaments in the first direction and then flow along the length of the second filaments in the second direction. Advantageously, increasing the path length for electric current flowing through the mesh increases the electrical resistance of the mesh. Advantageously, increasing the electrical resistance of the mesh increases the heat output of the heating element for a given electric current.

Preferably, the heating element comprises an electrically conductive portion extending between the second ends of the first filaments and the third ends of the second filaments. Advantageously, the electrically conductive portion facilitates the electrical connection of the second ends of the first filaments to the third ends of the second filaments.

Preferably, the electrically conductive portion electrically connects the second end of each of the first filaments to the third end of every second filament. Preferably, the electrically conductive portion electrically connects the third end of each of the second filaments to the second end of every first filament. Preferably, the electrically conductive portion is a continuous portion of electrically conductive material. For example, the electrically conductive portion may comprise a continuous area of electrically conductive material to which the second end of each of the first filaments and the third end of each of the second filaments is electrically connected. The second ends of the first filaments may be soldered to the electrically conductive portion. The third ends of the second filaments may be soldered to the electrically conductive portion.

The first filaments may comprise a first material having a first electrical conductivity, the second filaments may comprise a second material having a second electrical conductivity, and the electrically conductive portion may comprise a third material having a third electrical conductivity. Preferably, the third electrical conductivity is greater than both the first electrical conductivity and the second electrical conductivity.

Advantageously, providing the electrically conductive portion with a greater electrical conductivity than the first and second filaments facilitates the flow of electric current from the first filaments to the second filaments between the second ends of the first filaments and the third ends of the second filaments.

The first material may be the same as the second material. The first material may be different to the second material.

Preferably, each of the first material and the second material has an electrical conductivity of between about $0.8\times10^6$ Siemens per metre and about $1.7\times10^6$ Siemens per metre.

Preferably, the third material has an electrical conductivity of between about $8\times10^6$ Siemens per metre and about $80\times10^6$ Siemens per metre.

The mesh may comprise a plurality of contact points at which each of the first filaments overlies or underlies each of the second filaments. Preferably, the first electrical conductivity of the first filaments is greater than an electrical conductivity between each of the first filaments and each of the second filaments at the contact points. Preferably, the second electrical conductivity of the second filaments is greater than an electrical conductivity between each of the first filaments and each of the second filaments at the contact points. Preferably, the third electrical conductivity of the electrically conductive portion is greater than an electrical conductivity between each of the first filaments and each of the second filaments at the contact points.

The electrically conductive portion may comprise a metal. The electrically conductive portion may comprise at least one of copper, zinc, nickel, tin, silver, gold, and platinum. The electrically conductive portion may comprise at least one of silver, gold, and platinum. The electrically conductive portion may be formed from at least one of silver, gold and platinum.

Each of the first filaments may comprise a metal alloy. Examples of suitable metal alloys include stainless steel, constantan, nickel-, cobalt-, chromium-, aluminium-, titanium-, zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminium based alloys and iron-manganese-aluminium based alloys. Timetal® is a registered trade mark of Titanium Metals Corporation. Preferably, each of the first filaments comprises stainless steel, more preferably 300 series stainless steel such as AISI 304, 316, 304L, 316L. In a particularly preferred embodiment, each of the first filaments comprises AISI 304 stainless steel.

Each of the second filaments may comprise a metal alloy. Examples of suitable metal alloys include stainless steel, constantan, nickel-, cobalt-, chromium-, aluminium-, titanium-, zirconium-, hafnium-, niobium-, molybdenum-, tantalum-, tungsten-, tin-, gallium-, manganese- and iron-containing alloys, and super-alloys based on nickel, iron, cobalt, stainless steel, Timetal®, iron-aluminium based alloys and iron-manganese-aluminium based alloys. Timetal® is a registered trade mark of Titanium Metals Corporation. Preferably, each of the second filaments comprises stainless steel, more preferably 300 series stainless steel such as AISI 304, 316, 304L, 316L. In a particularly preferred embodiment, each of the second filaments comprises AISI 304 stainless steel.

Each of the first filaments may comprise a different material than each of the second filaments. Preferably, each of the first filaments comprises the same material as each of the second filaments.

The mesh may be woven or non-woven. Preferably, the mesh is woven.

The first filaments may extend in the weft direction and the second filaments may extend in the warp direction. The first filaments may extend in the warp direction and the second filaments may extend in the weft direction.

The mesh may define interstices between the first filaments and the second filaments and the interstices may have a width of between about 10 micrometres and about 100 micrometres. Preferably, the width of the interstices give rise to capillary action in the interstices, so that in use, liquid aerosol-forming substrate to be vaporised is drawn into the interstices, increasing the contact area between the heating element and the liquid aerosol-forming substrate.

The first filaments and the second filaments may form a mesh density of between about and about 240 filaments per centimetre (+/−10 percent). Preferably, the mesh density is between about 100 and about 140 filaments per centimetres (+/−10 percent). More preferably, the mesh density is approximately 115 filaments per centimetre. The width of the interstices may be between about 20 micrometres and about 300 micrometres, preferably between about 50 micrometres and about 100 micrometres, more preferably approximately 70 micrometres. The percentage of open area of the mesh, which is the ratio of the area of the interstices to the total area of the mesh may be between about 40 percent and about 90 percent, preferably between about 85 percent and about 80 percent, more preferably approximately 82 percent.

Each of the first filaments and each of the second filaments may have a width or a diameter of between about 10 micrometres and about 100 micrometres, preferably between about 10 micrometres and about 50 micrometres, more preferably between about 12 micrometres and about 25 micrometres, and most preferably approximately 16 micrometres. Each of the first filaments and each of the second filaments may have a round cross-section or may have a flattened cross-section.

The area of the mesh may be small, for example less than or equal to about 50 square millimetres, preferably less than or equal to about 25 square millimetres, more preferably approximately 15 square millimetres. Preferably, the area of the mesh facilitates incorporation of the heating element into a handheld system. Advantageously, sizing of the mesh with an area of less than or equal to about 50 square millimetres reduces the amount of total power required to heat the mesh while still ensuring sufficient contact of the mesh with a liquid aerosol-forming substrate. The mesh may be square. The mesh may be rectangular. The mesh may be cross-shaped. The mesh may have a maximum length of between about 2 millimetres and about 10 millimetres. The mesh may have a maximum width of between about 2 millimetres and about 10 millimetres. Preferably, the mesh has a maximum width of approximately 5 millimetres and a maximum length of approximately 5 millimetres.

Preferably, the mesh is substantially flat. Advantageously, a substantially flat mesh may facilitate simple manufacture of the heating element and an aerosol-generating system comprising the heating element. Geometrically, the term "substantially flat" is used to refer to a mesh that is in the form of a substantially two dimensional topological manifold. In some examples, the substantially flat mesh may extend in two dimensions along a surface substantially more than in a third dimension. In some examples, the dimensions of the substantially flat mesh in the two dimensions within the surface may be at least five times larger than in the third dimension, normal to the surface. In some examples, the substantially flat mesh may define two imaginary substantially parallel flat surfaces. In some examples, the substantially flat mesh may be a structure between two imaginary substantially parallel flat surfaces, wherein the distance between these two imaginary surfaces is substantially smaller than the extension within the surfaces. In some examples, only one of the two imaginary substantially parallel surfaces may be flat. In some examples, the substantially flat mesh may be planar. In other examples, the substantially flat mesh may be curved along one or more dimensions, for example forming a dome shape or bridge shape.

According to a second aspect of the present disclosure, there is provided a heater assembly for an aerosol-generating system. The heater assembly comprises a heating element according to the first aspect of the present invention, in accordance with any of the embodiments described herein. The heater assembly also comprises a first electrical contact electrically connected to the first end of at least one of the first filaments and a second electrical contact electrically connected to the fourth end of at least one of the second filaments.

The first and second electrical contacts facilitate the supply of electric current to and from the heating element. Preferably, the first electrical contact electrically connects the first ends of the first filaments to each other. Preferably, the second electrical contact electrically connects the fourth ends of the second filaments to each other.

Preferably, the first electrical contact is a continuous portion of electrically conductive material. For example, the first electrical contact may comprise a continuous area of electrically conductive material to which the first end of each of the first filaments is electrically connected. The first ends of the first filaments may be soldered to the first electrical contact.

Preferably, the second electrical contact is a continuous portion of electrically conductive material. For example, the second electrical contact may comprise a continuous area of electrically conductive material to which the fourth end of each of the second filaments is electrically connected. The fourth ends of the second filaments may be soldered to the second electrical contact.

The heater assembly may comprise a substrate on which the heating element is arranged. Preferably, the substrate defines an aperture extending through the substrate, wherein at least part of the heating element overlies the aperture. Advantageously, the aperture may facilitate the transport of a liquid aerosol-forming substrate to the heating element.

In embodiments in which the heating element comprises an electrically conductive portion, preferably the electrically conductive portion is provided on the substrate. In embodiments in which the heating element comprises first and second electrical contacts, preferably each of the first electrical contact and the second electrical contact is provided on the substrate.

The substrate may comprise any suitable material or combination of materials. The substrate may comprise a phenolic paper. The substrate may comprise a glass fibre reinforced epoxy resin. The substrate may comprise a plastic or thermoplastic that is suitable for food or pharmaceutical applications. The substrate may comprise at least one of polypropylene, polyetheretherketone (PEEK) and polyethylene. The material is preferably light and non-brittle.

The heater assembly may comprise at least two electrical terminals for supplying electrical power to the heating element. The heater assembly may comprise a first electrical terminal and a second electrical terminal. In embodiments in which the heating element comprises first and second electrical contacts, preferably the first electrical terminal is in contact with the first electrical contact and the second electrical terminal is in contact with the second electrical contact. Each of the electrical terminals may be a spring terminal. Each of the electrical terminals may comprise brass.

The heater assembly may further comprise a heater assembly housing, wherein the heating element is mounted on the heater assembly housing. In embodiments in which the heater assembly comprises at least two electrical terminals, the at least two electrical terminals may be mounted on the heater assembly housing.

In embodiments in which the heater assembly comprises a substrate, the substrate may be mounted on the heater assembly housing. The substrate may form part of the heater assembly housing.

The heater assembly housing may comprise any suitable material or combination of materials. Preferably, the heater assembly housing is formed from a plastic or thermoplastic that is suitable for food or pharmaceutical applications. For example, the heater assembly housing may comprise at least one of polypropylene, polyetheretherketone (PEEK) and polyethylene. The material is preferably light and non-brittle.

The heater assembly may further comprise a transport material for conveying a liquid aerosol-forming substrate to the heating element. Preferably, the transport material comprises a first end in contact with the mesh of the heating element. The transport material may comprise a capillary material. The transport material may comprise a capillary wick. The transport material may comprise a ceramic. The ceramic may comprise at least one of aluminium oxide, zirconium oxide and hydroxyapatite.

In embodiments in which the heater assembly comprises a heater assembly housing, at least a portion of the transport material may be received within the heater assembly housing. The transport material may be secured within the heater assembly housing by an interference fit.

The transport material may be formed by directly depositing a material on the mesh of the heating element. The transport material may be formed by directly depositing a ceramic on the mesh of the heating element. The ceramic may comprise at least one of aluminium oxide, zirconium oxide and hydroxyapatite.

According to a third aspect of the present disclosure there is provided a cartridge for an aerosol-generating system, the cartridge comprising a heater assembly according to the second aspect of the present disclosure, in accordance with any of the embodiments described herein. The cartridge also comprises a liquid storage compartment for holding a liquid aerosol-forming substrate.

As used herein, the term "aerosol" refers to a dispersion of solid particles, or liquid droplets, or a combination of solid particles and liquid droplets, in a gas. The aerosol may be visible or invisible. The aerosol may include vapours of substances that are ordinarily liquid or solid at room temperature as well as solid particles, or liquid droplets, or a combination of solid particles and liquid droplets.

As used herein, the term "aerosol-forming substrate" refers to a substrate capable of releasing volatile compounds that can form an aerosol. The volatile compounds may be released by heating or combusting the aerosol-forming substrate.

In embodiments in which the heater assembly comprises a heater assembly housing, the heater assembly housing may define at least part of the liquid storage compartment.

The liquid storage compartment may comprise first and second storage portions in communication with one another. A first storage portion of the liquid storage compartment may be on an opposite side of the heater assembly to the second storage portion of the liquid storage compartment. Liquid aerosol-forming substrate may be held in both the first and second storage portions of the liquid storage compartment.

Advantageously, the first storage portion of the storage compartment is larger than the second storage portion of the liquid storage compartment. The cartridge may be configured to allow a user to draw or suck on the cartridge to inhale aerosol generated in the cartridge. In use a mouth end opening of the cartridge is typically positioned above the heater assembly, with the first storage portion of the storage compartment positioned between the mouth end opening and the heater assembly. The first storage portion of the liquid storage compartment being larger than the second storage portion of the liquid storage compartment ensures that liquid is delivered from the first storage portion of the liquid storage compartment to the second storage portion of the liquid storage compartment under the influence of gravity.

The cartridge may have a mouth end through which generated aerosol can be drawn by a user and a connection end configured to connect to an aerosol-generating device. Preferably, a first side of the heating element faces the mouth end and a second side of the heating element faces the connection end.

In embodiments in which the heater assembly comprises a transport material, preferably the transport material is in fluid communication with the liquid storage compartment.

Preferably, the transport material is in fluid communication with the second storage portion of the liquid storage compartment. Preferably, a second end of the transport material is positioned within the second storage portion of the liquid storage compartment.

The cartridge may define an enclosed airflow passage from an air inlet past the first side of the heater assembly to a mouth end opening of the cartridge. The enclosed airflow passage may pass through the first storage portion or the second storage portion of the liquid storage compartment. In one embodiment the airflow passage extends between the first storage portion and the second storage portion of the liquid storage compartment. Additionally, the airflow passage may extend through the first storage portion of the liquid storage compartment. At least part of the first storage portion of the liquid storage compartment may have an annular cross section, wherein at least part of the airflow passage extends from the air inlet past the heater assembly to the mouth end opening through the first storage portion of the liquid storage compartment. At least part of the airflow passage may extend from the heater assembly to the mouth end opening adjacent to the first storage portion of the liquid storage compartment.

The cartridge may contain a retention material for holding a liquid aerosol-forming substrate. The retention material may be in the first storage portion of the liquid storage compartment, the second storage portion of the liquid storage compartment, or both the first storage portion and the second storage portion of the liquid storage compartment. The retention material may be a foam, a sponge, or a collection of fibres. The retention material may be formed from a polymer or a co-polymer. The retention material may be a spun polymer. The liquid aerosol-forming substrate may be released into the retention material during use. For example, the liquid aerosol-forming substrate may be provided in a capsule.

The cartridge advantageously contains a liquid aerosol-forming substrate within the liquid storage compartment. The liquid aerosol-forming substrate may comprise nicotine. The nicotine containing liquid aerosol-forming substrate may be a nicotine salt matrix. The liquid aerosol-forming substrate may comprise plant-based material. The liquid aerosol-forming substrate may comprise tobacco. The liquid aerosol-forming substrate may comprise a tobacco-containing material containing volatile tobacco flavour compounds, which are released from the aerosol-forming substrate upon heating. The liquid aerosol-forming substrate may comprise homogenised tobacco material. The liquid aerosol-forming substrate may comprise a non-tobacco-containing material. The liquid aerosol-forming substrate may comprise homogenised plant-based material.

The liquid aerosol-forming substrate may comprise one or more aerosol-formers. An aerosol-former is any suitable known compound or mixture of compounds that, in use, facilitates formation of a dense and stable aerosol and that is substantially resistant to thermal degradation at the temperature of operation of the system. Examples of suitable aerosol formers include glycerine and propylene glycol. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. The liquid aerosol-forming substrate may comprise water, solvents, ethanol, plant extracts and natural or artificial flavours.

The liquid aerosol-forming substrate may comprise nicotine and at least one aerosol-former. The aerosol-former may be glycerine or propylene glycol. The aerosol former may comprise both glycerine and propylene glycol. The liquid aerosol-forming substrate may have a nicotine concentration of between about 0.5 percent and about 10 percent, for example about 2 percent.

The cartridge may comprise a cartridge housing. The cartridge housing may be formed form a mouldable plastics material, such as polypropylene (PP) or polyethylene terephthalate (PET). The cartridge housing may form a part or all of a wall of one or both portions of the liquid storage compartment. The cartridge housing and the liquid storage compartment may be integrally formed. Alternatively the liquid storage compartment may be formed separately from the cartridge housing and assembled to the cartridge housing.

According to a fourth aspect of the present disclosure there is provided an aerosol-generating system comprising a cartridge according to the third aspect of the present disclosure, in accordance with any of the embodiments described herein. The aerosol-generating system also comprises an aerosol-generating device arranged to be removably coupled to the cartridge. The aerosol-generating device comprises a power supply for supplying electrical power to the heating element.

The aerosol-generating device may comprise control circuitry configured to control a supply of electrical power from the power supply to the heating element.

The control circuitry may comprise a microprocessor. The microprocessor may be a programmable microprocessor, a microcontroller, or an application specific integrated chip (ASIC) or other electronic circuitry capable of providing control. The control circuitry may comprise further electronic components. For example, in some embodiments, the control circuitry may comprise any of: sensors, switches, display elements. Power may be supplied to the heating element continuously following activation of the aerosol-generating device or may be supplied intermittently, such as on a puff-by-puff basis. The power may be supplied to the heating element in the form of pulses of electrical current, for example, by means of pulse width modulation (PWM).

The power supply may be a DC power supply. The power supply may be a battery. The battery may be a Lithium based battery, for example a Lithium-Cobalt, a Lithium-Iron-Phosphate, a Lithium Titanate or a Lithium-Polymer battery. The battery may be a Nickel-metal hydride battery or a Nickel cadmium battery. The power supply may be another form of charge storage device such as a capacitor. The power supply may be rechargeable and be configured for many cycles of charge and discharge. The power supply may have a capacity that allows for the storage of enough energy for one or more user experiences; for example, the power supply may have sufficient capacity to allow for the continuous generation of aerosol for a period of about six minutes, corresponding to the typical time taken to smoke a conventional cigarette, or for a period that is a multiple of six minutes. In another example, the power supply may have sufficient capacity to allow for a predetermined number of puffs or discrete activations of the heating element.

The aerosol-generating device may comprise a device housing. The device housing may be elongate. The device housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. The material is preferably light and non-brittle.

The aerosol-generating system may be a handheld aerosol-generating system. The aerosol-generating system may be a handheld aerosol-generating system configured to allow a user to puff on a mouthpiece to draw an aerosol through a mouth end opening. The aerosol-generating system may have a size comparable to a conventional cigar or cigarette. The aerosol-generating system may have a total length of between about 30 millimetres and about 150 millimetres. The aerosol-generating system may have an external diameter of between about 5 millimetres and about 30 millimetres.

The invention is defined in the claims. However, below there is provided a non-exhaustive list of non-limiting examples. Any one or more of the features of these examples may be combined with any one or more features of another example, embodiment, or aspect described herein.

Example Ex1: A heating element for an aerosol-generating system, the heating element comprising a mesh, the mesh comprising:

a plurality of first filaments extending in a first direction, wherein each of the first filaments comprises a first end and a second end;

a plurality of second filaments extending in a second direction, wherein the first direction is perpendicular to the second direction, and wherein each of the second filaments comprises a third end and a fourth end; and wherein the second ends of the first filaments are electrically connected to the third ends of the second filaments.

Example Ex2: A heating element according to Example Ex1, further comprising an electrically conductive portion extending between the second ends of the first filaments and the third ends of the second filaments.

Example Ex3: A heating element according to Example Ex2, wherein the first filaments comprise a first material having a first electrical conductivity, wherein the second filaments comprise a second material having a second electrical conductivity, wherein the electrically conductive portion comprises a third material having a third electrical conductivity, and wherein the third electrical conductivity is greater than both the first electrical conductivity and the second electrical conductivity.

Example Ex4: A heating element according to Example Ex2 or Ex3, wherein the electrically conductive portion comprises at least one of copper, zinc, nickel, tin, silver, gold, and platinum.

Example Ex5: A heating element according to Example Ex2 or Ex3, wherein the electrically conductive portion comprises at least one of silver, gold and platinum.

Example Ex6: A heating element according to Example Ex2 or Ex3, wherein the electrically conductive portion is formed from at least one of silver, gold and platinum.

Example Ex7: A heating element according to any preceding Example, wherein each of the first filaments comprises stainless steel.

Example Ex8: A heating element according to any preceding Example, wherein each of the second filaments comprises stainless steel.

Example Ex9: A heating element according to any preceding Example, wherein the mesh is a woven mesh.

Example Ex10: A heating element according to any preceding Example, wherein each of the first filaments has a width or a diameter of between about 10 micrometres and about 100 micrometres.

Example Ex11: A heating element according to any preceding Example, wherein each of the first filaments has a width or a diameter of between about 10 micrometres and about micrometres.

Example Ex12: A heating element according to any preceding Example, wherein each of the first filaments has a width or a diameter of between about 12 micrometres and about micrometres.

Example Ex13: A heating element according to any preceding Example, wherein each of the second filaments has a width or a diameter of between about 10 micrometres and about 100 micrometres.

Example Ex14: A heating element according to any preceding Example, wherein each of the second filaments has a width or a diameter of between about 10 micrometres and about 50 micrometres.

Example Ex15: A heating element according to any preceding Example, wherein each of the second filaments has a width or a diameter of between about 12 micrometres and about 25 micrometres.

Example Ex16: A heater assembly for an aerosol-generating system, the heater assembly comprising:

a heating element according to any preceding Example;

a first electrical contact connected to the first end of at least one of the first filaments; and a second electrical contact connected to the fourth end of at least one of the second filaments.

Example Ex17: A heater assembly according to Example Ex8, further comprising a substrate defining an aperture extending through the substrate, wherein at least part of the heating element overlies the aperture, and wherein each of the first electrical contact and the second electrical contact is provided on the substrate.

Example Ex18: A heater assembly according to Example Ex9, further comprising an electrically conductive portion extending between the second ends of the first filaments and the third ends of the second filaments.

Example Ex19: A heater assembly according to Example Ex10, wherein the electrically conductive portion is provided on the substrate.

Example Ex20: A heater assembly according to any of Examples Ex8 to Ex11, further comprising a transport material for conveying a liquid aerosol-forming substrate to the heating element.

Example Ex21: A cartridge for an aerosol-generating system, the cartridge comprising:

a heater assembly according to any of Examples Ex8 to Ex12; and a liquid storage compartment for holding a liquid aerosol-forming substrate.

Example Ex22: An aerosol-generating system comprising:

a cartridge according to Example Ex13; and an aerosol-generating device arranged to be removably coupled to the cartridge, the aerosol-generating device comprising a power supply for supplying electrical power to the heating element.

Examples will now be further described with reference to the figures in which.

Figure 1:
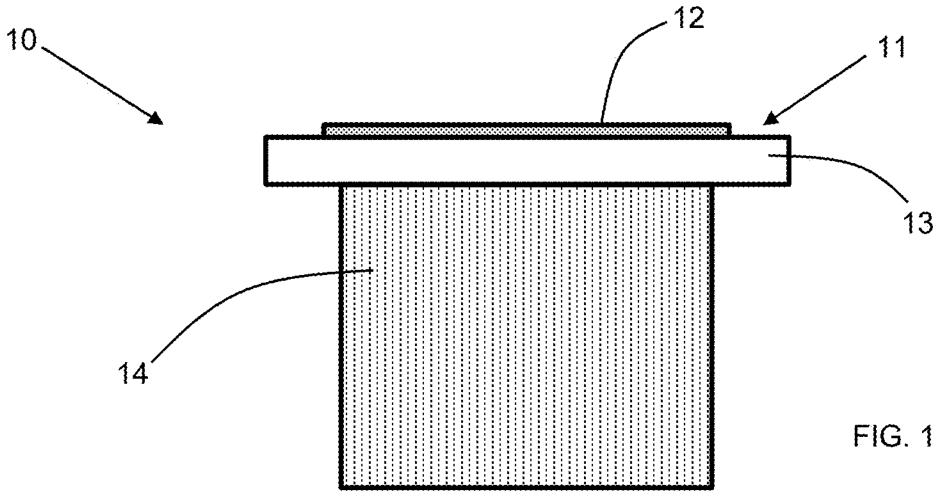
FIG. 1 is a schematic side view of a heater assembly in accordance with an example of the present disclosure.
Figure 2:
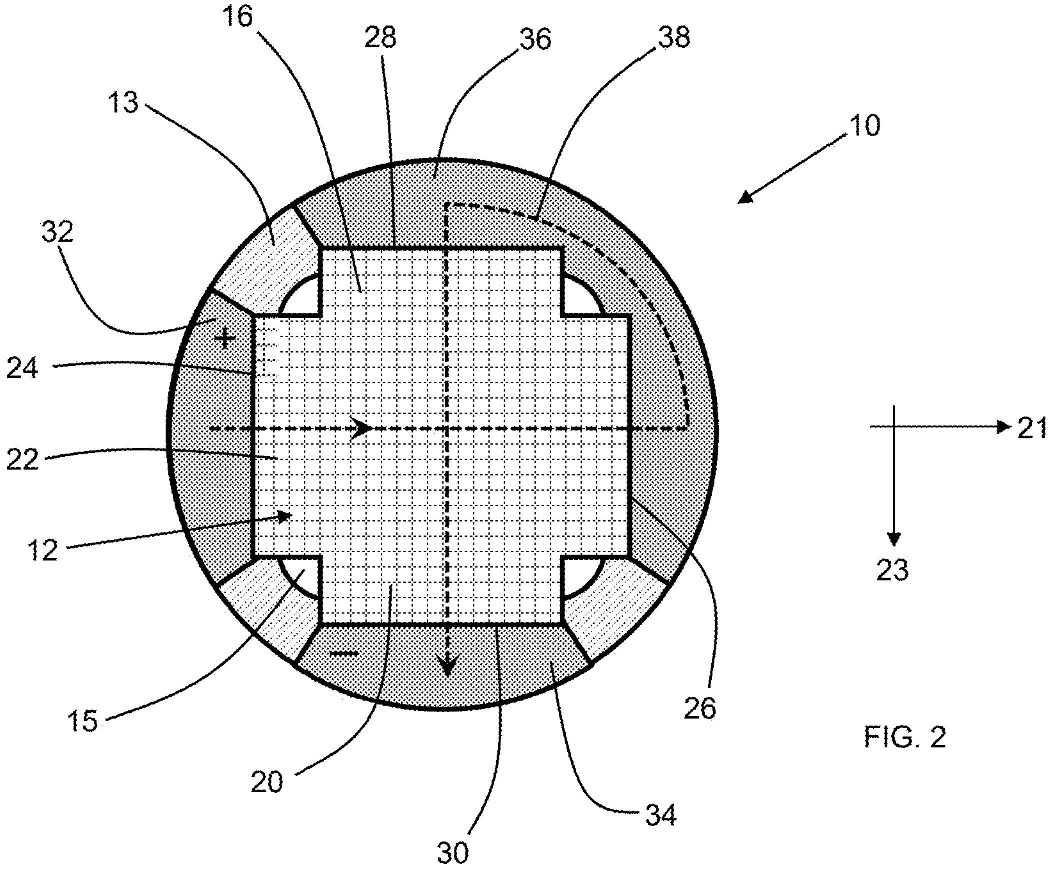
FIG. 2 is schematic top view of the heater assembly of FIG. 1.

Referring to FIGS. 1 and 2, there is shown a heater assembly 10 comprising a heating element 11 and a ceramic transport material 14.

The heating element 11 comprises an electrically conductive mesh 12 arranged on a substrate 13. The mesh 12 is woven and comprises a plurality of first filaments 20 extending in a first direction 21 and a plurality of second filaments 22 extending in a second direction 23 perpendicular to the first direction 21. Each of the first filaments 20 has a first end 24 and a second end 26. Each of the second filaments 22 has a third end 28 and a fourth end 30. Each of the first and second filaments 20, 22 is formed from stainless steel.

A first electrical contact 32 is arranged on the substrate 13 and is electrically connected to the first ends 24 of the first filaments 20. A second electrical contact 34 is arranged on the substrate 13 and is electrically connected to the fourth ends 30 of the second filaments 22. An electrically conductive portion 36 is arranged on the substrate 13 and electrically connects the second ends 26 of the first filaments 20 to the third ends 28 of the second filaments 22. The electrically conductive portion 36 is formed from a material having an electrical conductivity that is higher than the electrical conductivity of the stainless steel forming the first and second filaments 20, 22. For example, the electrically conductive portion 36 may be formed from brass or copper. During use, a voltage is applied across the first and second electrical contacts 32, 34 to drive an electric current through the first filaments 20 and the second filaments 22 via the electrically conductive portion 36.

In the example shown in FIG. 2, the first electrical contact 32 is connected to a positive terminal of a DC power supply and the second electrical contact 34 is connected to the negative terminal of the DC power supply. The resulting electric current flows from the first electrical contact 32 along the first filaments 20 to the electrically conductive portion 36, and from the electrically conductive portion 36 along the second filaments 22 to the second electrical contact 34, as illustrated by the dashed line 38. The electric current flowing through the first filaments 20 and the second filaments 22 resistively heats the mesh 12. Advantageously, the electrically conductive portion 36 facilitates resistive heating along the length of both the first filaments 20 and the second filaments 22.

The skilled person will appreciate that the arrangement illustrated in FIG. 2 is only exemplary, and the polarity of the first and second electrical contacts 32, 34 can be reversed. It is also possible to electrically connect the first and second electrical contacts 32, 34 to opposite terminals of an AC power supply.

The ceramic transport material 14 is in direct contact with the mesh 12 via an aperture 15 in the substrate 13. The ceramic transport material 14 is arranged to convey a liquid aerosol-forming substrate to the mesh 12. A plurality of interstices 16 are defined between the first and second filaments 20, 22 of the mesh 12. During heating, vaporised aerosol-forming substrate is released from the heater assembly 10 via the interstices 16 to generate an aerosol.

Figure 3:
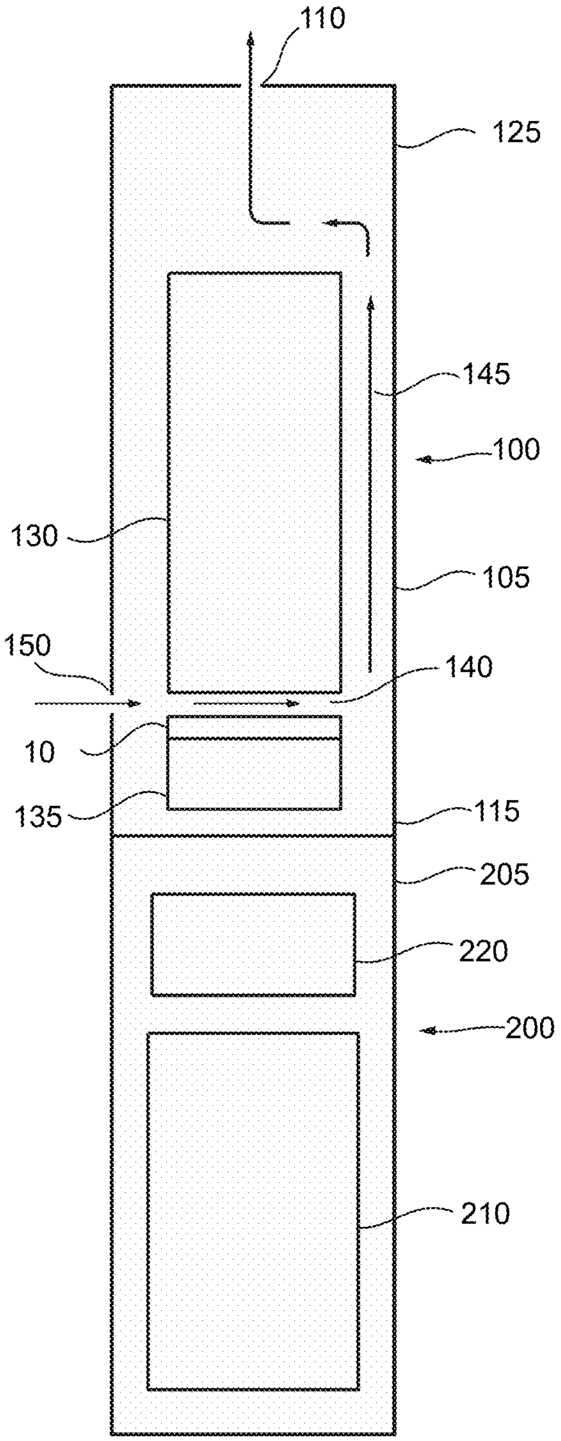
FIG. 3 is a schematic side cross-sectional view of an example aerosol-generating system comprising a cartridge and an aerosol-generating device.
Figure 4:
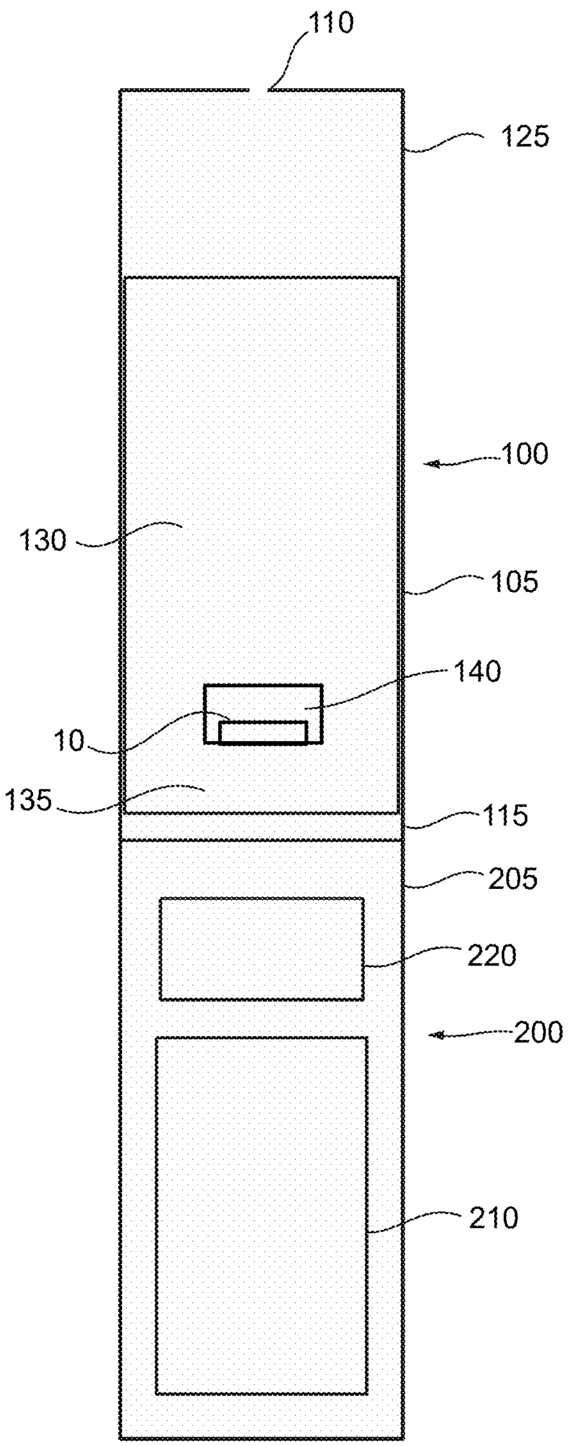
FIG. 4 a schematic side cross-sectional view of the aerosol-generating system of FIG. 3 rotated through 90 degrees about the longitudinal axis of the aerosol-generating system.

FIG. 3 is a schematic cross-sectional view of an example aerosol-generating system. FIG. 4 shows the same cross-sectional view with the aerosol-generating system rotated through 90 degrees about its longitudinal axis.

The aerosol-generating system comprises two main components, a cartridge 100 and an aerosol-generating device 200. A connection end 115 of the cartridge 100 is removably connected to a corresponding connection end 205 of the aerosol-generating device 200. The connection end 115 of the cartridge 100 and connection end 205 of the aerosol-generating device 200 each have electrical contacts or connections (not shown) which are arranged to cooperate to provide an electrical connection between the cartridge 100 and the aerosol-generating device 200. The aerosol-generating device 200 contains a power supply 210 in the form of a battery, which in this example is a rechargeable lithium ion battery, and control circuitry 220. The aerosol-generating system is portable and has a size comparable to a conventional cigar or cigarette. A mouthpiece 125 is arranged at the end of the cartridge 100 opposite the connection end 115.

The cartridge 100 comprises a cartridge housing 105 containing the heater assembly 10 of FIGS. 1 and 2 and a liquid storage compartment having a first storage portion 130 and a second storage portion 135. A liquid aerosol-forming substrate is held in the liquid storage compartment. As shown in FIG. 4, the first storage portion 130 of the liquid storage compartment is connected to the second storage portion 135 of the liquid storage compartment by an annular part of the first storage portion 130. Therefore, liquid aerosol-forming substrate in the first storage portion 130 can pass to the second storage portion 135. The heater assembly 10 receives liquid from the second storage portion 135 of the liquid storage compartment. At least a portion of the ceramic transport material 14 of the heater assembly 10 extends into the second storage portion 135 of the liquid storage compartment to contact the liquid aerosol-forming substrate therein.

An air flow passage 140, 145 extends through the cartridge 100 from an air inlet 150 formed in a side of the cartridge housing 105, past the mesh 12 of the heater assembly 10, and from the heater assembly 10 to a mouthpiece opening 110 formed in the cartridge housing 105 at an end of the cartridge 100 opposite to the connection end 115.

The components of the cartridge 100 are arranged so that the first storage portion 130 of the liquid storage compartment is between the heater assembly 10 and the mouthpiece opening 110, and the second storage portion 135 of the liquid storage compartment is positioned on an opposite side of the heater assembly 10 to the mouthpiece opening 110. In other words, the heater assembly 10 lies between the first and second portions 130, 135 of the liquid storage compartment and receives liquid from the second storage portion 135. The first storage portion 130 of the liquid storage compartment is closer to the mouthpiece opening 110 than the second storage portion 135 of the liquid storage compartment. The air flow passage 140, 145 extends past the mesh 12 of the heater assembly 10 and between the first 130 and second 135 portions of the liquid storage compartment.

The aerosol-generating system is configured so that a user can puff or draw on the mouthpiece 125 of the cartridge to draw aerosol into their mouth through the mouthpiece opening 110. In operation, when a user puffs on the mouthpiece 125, air is drawn through the airflow passage 140, 145 from the air inlet 150, past the heater assembly 10, to the mouthpiece opening 110. The control circuitry 220 controls the supply of electrical power from the power supply 210 to the cartridge 100 when the system is activated. This in turn controls the amount and properties of the vapour produced by the heater assembly 10. The control circuitry 220 may include an airflow sensor (not shown) and the control circuitry 220 may supply electrical power to the heater assembly 10 when user puffs are detected by the airflow sensor. This type of control arrangement is well established in aerosol-generating systems such as inhalers and e-cigarettes. When a user puffs on the mouthpiece opening 110 of the cartridge 100, the heater assembly 10 is activated and generates a vapour that is entrained in the air flow passing through the air flow passage 140. The vapour cools within the airflow in passage 145 to form an aerosol, which is then drawn into the user's mouth through the mouthpiece opening 110.

In operation, the mouthpiece opening 110 is typically the highest point of the system. The construction of the cartridge 100, and in particular the arrangement of the heater assembly 10 between the first and second storage portions 130, 135 of the liquid storage compartment, is advantageous because it exploits gravity to ensure that the liquid aerosol-forming substrate is delivered to the heater assembly 10 even when the liquid storage compartment is becoming empty, but prevents an oversupply of liquid to the heater assembly 10 which might lead to leakage of liquid into the air flow passage 140.

The invention claimed is:

1. A heating element for an aerosol-generating system, the heating element comprising a mesh, the mesh comprising:

a plurality of first filaments extending in a first direction, wherein each of the first filaments comprises a first end and a second end;

a plurality of second filaments extending in a second direction, wherein the first direction is perpendicular to the second direction, and wherein each of the second filaments comprises a third end and a fourth end; and wherein the second ends of the first filaments are electrically connected to the third ends of the second filaments.

2. The heating element according to claim 1, wherein the first filaments comprise a first material having a first electrical conductivity, wherein the second filaments comprise a second material having a second electrical conductivity, wherein the electrically conductive portion comprises a third material having a third electrical conductivity, and wherein the third electrical conductivity is greater than both the first electrical conductivity and the second electrical conductivity.

3. The heating element according to claim 1, wherein the electrically conductive portion comprises at least one of silver, gold and platinum.

4. The heating element according to claim 1, wherein each of the first filaments comprises stainless steel.

5. The heating element according to an claim 1, wherein each of the second filaments comprises stainless steel.

6. The heating element according to claim 1, wherein the mesh is a woven mesh.

7. A heater assembly for an aerosol-generating system, the heater assembly comprising:

a heating element according to claim 1;

a first electrical contact connected to the first end of at least one of the first filaments; and a second electrical contact connected to the fourth end of at least one of the second filaments.

8. The heater assembly according to claim 7, further comprising a substrate defining an aperture extending through the substrate, wherein at least part of the heating element overlies the aperture, and wherein each of the first electrical contact and the second electrical contact is provided on the substrate.

9. The heater assembly according to claim 8, wherein the electrically conductive portion is provided on the substrate.

10. A heater assembly according to claim 7, further comprising a transport material for conveying a liquid aerosol-forming substrate to the heating element.

11. A cartridge for an aerosol-generating system, the cartridge comprising:

a heater assembly according to claim 7; and a liquid storage compartment for holding a liquid aerosol-forming substrate.

12. An aerosol-generating system comprising:

a cartridge according to claim 11; and an aerosol-generating device arranged to be removably coupled to the cartridge, the aerosol-generating device comprising a power supply for supplying electrical power to the heating element.

* * * * *